United States Patent
Niu et al.

(10) Patent No.: US 9,973,916 B2
(45) Date of Patent: May 15, 2018

(54) UE-BASED D2D DISCOVERY

(71) Applicants: Huaning Niu, Milpitas, CA (US); Debdeep Chatterjee, Santa Clara, CA (US); Gang Xiong, Beaverton, OR (US); Qinghua Li, San Ramon, CA (US); Hujun Yin, Saratoga, CA (US)

(72) Inventors: Huaning Niu, Milpitas, CA (US); Debdeep Chatterjee, Santa Clara, CA (US); Gang Xiong, Beaverton, OR (US); Qinghua Li, San Ramon, CA (US); Hujun Yin, Saratoga, CA (US)

(73) Assignee: Intel IP Corporation, Santa Clara, CA (US)

( * ) Notice: Subject to any disclaimer, the term of this patent is extended or adjusted under 35 U.S.C. 154(b) by 88 days.

(21) Appl. No.: 14/763,209

(22) PCT Filed: Dec. 26, 2013

(86) PCT No.: PCT/US2013/077753
§ 371 (c)(1),
(2) Date: Jul. 24, 2015

(87) PCT Pub. No.: WO2014/130156
PCT Pub. Date: Aug. 28, 2014

(65) Prior Publication Data
US 2015/0365942 A1    Dec. 17, 2015

Related U.S. Application Data

(60) Provisional application No. 61/768,330, filed on Feb. 22, 2013.

(51) Int. Cl.
*H04W 8/00* (2009.01)
*H04W 72/04* (2009.01)
(Continued)

(52) U.S. Cl.
CPC ......... *H04W 8/005* (2013.01); *H04L 12/4633* (2013.01); *H04L 27/2614* (2013.01);
(Continued)

(58) Field of Classification Search
CPC ..... H04W 8/005; H04W 48/16; H04W 48/08; H04W 28/0289; H04W 28/12;
(Continued)

(56) References Cited

U.S. PATENT DOCUMENTS 8,155,102 B1 * 4/2012 Hakola ............ H04W 74/0866
370/338
9,179,475 B2 * 11/2015 Koleszar ................ H04L 45/32
(Continued)

FOREIGN PATENT DOCUMENTS

CN 102859925 A 1/2013
JP 2012-507974 A 3/2012
(Continued)

OTHER PUBLICATIONS

International Search Report and Written Opinion received for PCT Application No. PCT/US2013/077753, dated Mar. 31, 2014, 9 pages.
(Continued)

*Primary Examiner* — Edan Orgad
*Assistant Examiner* — Ivan O Latorre
(74) *Attorney, Agent, or Firm* — Grossman, Tucker, Perreault & Pfleger, PLLC

(57) ABSTRACT

In one embodiment, the present disclosure provides an evolved Node B (eNB) that includes a device-to-device (D2D) module configured to allocate at least one D2D discovery region including at least one periodic discovery zone, the at least one periodic discovery zone including a first plurality of resource blocks in frequency and a second plurality of subframes in time, the D2D module further
(Continued)

configured to configure a User Equipment (UE) to utilize the at least one D2D discovery region for transmitting a discovery packet.

26 Claims, 6 Drawing Sheets

(51) Int. Cl.

| | |
|---|---|
| H04W 74/02 | (2009.01) |
| H04W 76/02 | (2009.01) |
| H04W 72/00 | (2009.01) |
| H04W 76/04 | (2009.01) |
| H04L 12/46 | (2006.01) |
| H04W 4/00 | (2018.01) |
| H04L 29/12 | (2006.01) |
| H04W 28/02 | (2009.01) |
| H04W 40/02 | (2009.01) |
| H04W 48/18 | (2009.01) |
| H04W 24/06 | (2009.01) |
| H04W 74/00 | (2009.01) |
| H04W 74/04 | (2009.01) |
| H04W 74/08 | (2009.01) |
| H04W 36/00 | (2009.01) |
| H04W 36/30 | (2009.01) |
| H04L 27/26 | (2006.01) |
| H04W 40/24 | (2009.01) |
| H04W 24/02 | (2009.01) |
| H04W 48/14 | (2009.01) |
| H04W 52/02 | (2009.01) |
| H04W 28/12 | (2009.01) |
| H04L 12/801 | (2013.01) |
| H04W 48/08 | (2009.01) |
| H04W 48/16 | (2009.01) |
| H04W 72/02 | (2009.01) |
| H04W 88/06 | (2009.01) |
| H04L 12/725 | (2013.01) |
| H04W 28/08 | (2009.01) |
| H04W 84/12 | (2009.01) |

(52) U.S. Cl.
CPC .............. *H04L 47/11* (2013.01); *H04L 47/12* (2013.01); *H04L 61/2514* (2013.01); *H04L 61/2525* (2013.01); *H04L 61/2539* (2013.01); *H04L 61/2564* (2013.01); *H04L 61/2575* (2013.01); *H04L 61/2592* (2013.01); *H04L 61/6077* (2013.01); *H04W 4/005* (2013.01); *H04W 4/008* (2013.01); *H04W 24/02* (2013.01); *H04W 24/06* (2013.01); *H04W 28/02* (2013.01); *H04W 28/0289* (2013.01); *H04W 28/12* (2013.01); *H04W 36/0088* (2013.01); *H04W 36/30* (2013.01); *H04W 40/02* (2013.01); *H04W 40/244* (2013.01); *H04W 48/08* (2013.01); *H04W 48/14* (2013.01); *H04W 48/16* (2013.01); *H04W 48/18* (2013.01); *H04W 52/028* (2013.01); *H04W 52/0216* (2013.01); *H04W 72/005* (2013.01); *H04W 72/02* (2013.01); *H04W 72/042* (2013.01); *H04W 72/0413* (2013.01); *H04W 72/0446* (2013.01); *H04W 74/002* (2013.01); *H04W 74/02* (2013.01); *H04W 74/04* (2013.01); *H04W 74/08* (2013.01); *H04W 76/023* (2013.01); *H04W 76/043* (2013.01); *H04L 45/30* (2013.01); *H04W 28/08* (2013.01); *H04W 84/12* (2013.01); *H04W 88/06* (2013.01); *Y02D 70/00* (2018.01); *Y02D 70/1222* (2018.01); *Y02D 70/1224* (2018.01); *Y02D 70/1226* (2018.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/21* (2018.01); *Y02D 70/22* (2018.01); *Y02D 70/23* (2018.01)

(58) Field of Classification Search
CPC ........... H04W 52/0216; H04W 52/028; H04W 48/14; H04W 4/005; H04W 24/02; H04W 40/244; H04W 36/30; H04W 36/0088; H04W 72/0446; H04W 74/08; H04W 74/04; H04W 74/002; H04W 76/043; H04W 4/008; H04W 72/005; H04W 76/023; H04W 24/06; H04W 48/18; H04W 40/02; H04W 28/02; H04W 74/02; H04W 72/0413; H04W 84/12; H04W 28/08; H04W 88/06; H04L 61/2514; H04L 61/6077; H04L 61/2592; H04L 61/2564; H04L 61/2575; H04L 61/2525; H04L 47/11; H04L 47/12; H04L 27/2614; H04L 61/2539; H04L 12/4633; H04L 45/30; Y02B 60/50
See application file for complete search history.

(56) References Cited

U.S. PATENT DOCUMENTS

| | | | |
|---|---|---|---|
| 2008/0318607 A1* | 12/2008 | Torsner | H04W 74/02 455/509 |
| 2009/0116430 A1 | 5/2009 | Bonta et al. | |
| 2009/0190541 A1 | 7/2009 | Abedi | |
| 2010/0110929 A1* | 5/2010 | Li | H04B 1/7143 370/254 |
| 2010/0157955 A1* | 6/2010 | Liu | H04W 72/0446 370/336 |
| 2011/0201332 A1 | 8/2011 | Siomina et al. | |
| 2011/0268101 A1* | 11/2011 | Wang | H04L 5/0053 370/344 |
| 2011/0282989 A1 | 11/2011 | Geirhofer et al. | |
| 2012/0076049 A1 | 3/2012 | Rudolf et al. | |
| 2013/0109301 A1* | 5/2013 | Hakola | H04W 76/023 455/39 |
| 2013/0128858 A1* | 5/2013 | Zou | H04W 72/0453 370/329 |
| 2013/0159522 A1* | 6/2013 | Hakola | H04L 63/0823 709/225 |
| 2013/0188546 A1* | 7/2013 | Turtinen | H04W 8/005 370/312 |
| 2014/0003262 A1* | 1/2014 | He | H04W 28/08 370/252 |
| 2014/0029596 A1* | 1/2014 | Li | H04W 8/005 370/338 |
| 2014/0031028 A1* | 1/2014 | Yamada | H04W 76/023 455/419 |
| 2014/0056220 A1* | 2/2014 | Poitau | H04W 40/246 370/328 |
| 2014/0086152 A1* | 3/2014 | Bontu | H04L 1/1812 370/329 |
| 2014/0094183 A1* | 4/2014 | Gao | H04W 72/048 455/450 |
| 2014/0112194 A1* | 4/2014 | Novlan | H04W 8/005 370/254 |
| 2014/0185529 A1* | 7/2014 | Lim | H04W 76/023 370/328 |
| 2014/0335875 A1* | 11/2014 | Li | H04W 8/005 455/450 |
| 2014/0342747 A1* | 11/2014 | Lee | H04L 5/0053 455/450 |

(56) References Cited

U.S. PATENT DOCUMENTS

| | | | |
|---|---|---|---|
| 2015/0003287 A1* | 1/2015 | Kalhan | H04W 24/08 370/254 |
| 2015/0045018 A1* | 2/2015 | Liu | H04L 1/00 455/426.1 |
| 2015/0156619 A1* | 6/2015 | Fodor | H04W 8/005 455/434 |
| 2015/0181406 A1* | 6/2015 | Seo | H04W 76/023 370/329 |
| 2015/0245192 A1* | 8/2015 | Wu | H04W 8/005 370/329 |
| 2015/0264551 A1* | 9/2015 | Ko | H04W 8/005 370/329 |
| 2015/0327046 A1* | 11/2015 | Lee | H04W 56/002 370/338 |
| 2016/0183167 A1* | 6/2016 | Agiwal | H04W 48/16 370/329 |
| 2016/0198507 A1* | 7/2016 | Wu | H04W 8/005 370/330 |
| 2016/0212793 A1* | 7/2016 | Jung | H04W 36/0016 |
| 2016/0242152 A1* | 8/2016 | Yu | H04W 8/005 |

FOREIGN PATENT DOCUMENTS

| | | |
|---|---|---|
| WO | 2011-130630 A1 | 10/2011 |
| WO | 2013-022471 A1 | 2/2013 |
| WO | 2014130154 A1 | 8/2014 |

OTHER PUBLICATIONS

3GPP TS 36.212, V10.1.0 (Mar. 2011), 3rd Generation Partnership Project; Technical Specification Group Radio Access Network; Evolved Universal Terrestrial Radio Access (E-UTRA); Multiplexing and channel coding (Release 10), 2011, 76 pages.

3GPP TS 36.331, V10.1.0 (Mar. 2011), 3rd Generation Partnership Project; Technical Specification Group Radio Access Network; Evolved Universal Terrestrial Radio Access (E-UTRA); Radio Resource Control (RRC); Protocol specification (Release 10), 2011, 290 pages.

3GPP TS 36.211, V10.1.0 (Mar. 2011), 3rd Generation Partnership Project; Technical Specification Group Radio Access Network; Evolved Universal Terrestrial Radio Access (E-UTRA); Physical Channels and Modulation (Release 10), 2011, 103 pages.

3GPP TS 36.213, V10.1.0 (Mar. 2011), 3rd Generation Partnership Project; Technical Specification Group Radio Access Network; Evolved Universal Terrestrial Radio Access (E-UTRA); Physical layer procedures (Release 10), 2011, 115 pages.

3GPP TS 36.304, V9.2.0 (Mar. 2010), 3rd Generation Partnership Project; Technical Specification Group Radio Access Network; Evolved Universal Terrestrial Radio Access (E-UTRA); User Equipment (UE) procedures in idle mode (Release 9), 2010, 32 pages.

3GPP TS 23.221, V8.8.0 (Mar. 2011), 3rd Generation Partnership Project; Technical Specification Group Services and System Aspects; Architectural requirements (Release 8), 2011, 47 pages.

3GPP TS 24.301, Version 10.3.0, Release 10, Universal Mobile Telecommunications System (UMTS); LTE; Non-Access-Stratum (NAS) protocol for Evolved Packet System (EPS); Stage 3, 2011, 308 pages.

3GPP TS 36.413, Version 10.5.0, Release 10, LTE; Evolved Universal Terrestrial Radio Access Network (E-UTRAN); S1 Application Protocol (S1AP), 2012, 262 pages.

3GPP TS 33.401, Version 10.3.0, Release 10, Digital Cellular telecommunications system (Phase 2+); Universal Mobile Telecommunications System (UMTS); LTE; 3GPP System Architecture Evolution (SAE); Security architecture, 2012, 118 pages.

Extended European Search Report issued in EP Application No. 13875795.0, dated Sep. 21, 2016.

Qualcomm Incorporation: "Proposed solution for direct discovery and communication using E-UTRAN", SA WG2 Meeting #95 S2-130308, Prague, Czech Republic, Jan. 28-Feb. 1, 2013.

Japanese Office Action issued in Japanese Application No. 2015-555168, dated Jul. 5, 2016, with English translation.

Korean Office Action issued in Korean Application No. 10-2015-7020003, dated Aug. 2, 2016, with English translation.

Gábor Foder et al., "Design Aspects of Network Assisted Device-to-Device Communications," IEEE Communication Magazine, vol. 50, issue 3, pp. 170-177, (Mar. 2012).

InterDigital: "Recommendations for D2D evaluation methodology and assumptions", 3GPP TSG-RAN WG1 Meeting #72, St. Julian's, Malta, Jan. 28-Feb. 1, 2013.

Korean Office Action issued in Korean Application No. 10-2015-7020003, dated Jun. 1, 2017, with English translation, 7 pages.

Chinese Office Action issued in Chinese Application No. 201380070485.5, dated Dec. 11, 2017, with English machine translation, 15 pages.

Intel Corporation: "Type 2B resource allocation for D2D discovery", 3GPP Draft; R2-134287 Type 2B Resource Allocation for D2D Discovery, 3rd Generation Partnership Project (3GPP), Mobile Competence Centre; 650, Route des Lucioles; F-06921 Sophia-Antipolis Cedex; FR1-15 vol. RAN WG2, No. San Francisco, USA; Nov. 11, 2013-Nov. 15, 2013, Nov. 13, 2013 (Nov. 13, 2013), XP050737025, Retrieved from the internet at the following URL: http://www.3gpp.org/ftp/tsg_ran/WG2_RL2/TSGR2_84/docs/R2-134287.zip.

Intel Corporation: "Type 1 Resource Allocation for D2D discovery", 3GPP Draft; Type 1 Resource Allocation for D2D Discovery, 3rd Generation Partnership Project (3GPP), Mobile Competence Centre; 650, Route des Lucioles; F-06921 Sophia-Antipolis Cedex; FRA1-15 Technical Fields Searched (IPC) vol. RAN WG2, No. San Francisco, USA; Nov. 11, 2013-Nov. 15, 2013, Nov. 13, 2013 (Nov. 13, 2013), XP050737023, Retrieved from the Internet at the following URL: http://www.3gpp.org/ftp/tsg_ran/WG2_RL2/TSGR2_84/docs/R2-134285.zip.

Korean Office Action issued in Korean Application No. 10-2017-7033831, dated Jan. 26, 2018, with English translation, 9 pages.

Extended European Search Report issued in European Application No. 17200772.6, dated Feb. 8, 2018, 10 pages.

* cited by examiner

UE-BASED D2D DISCOVERY

CROSS-REFERENCE TO RELATED APPLICATIONS

The present patent application is related to and claims priority to U.S. Provisional Patent Application Ser. No. 61/768,330 filed Feb. 22, 2013, the teachings of which are incorporated herein by reference in their entirety.

FIELD

The present disclosure relates to wireless networks, and more particularly, to apparatus and methods for User Equipment (UE)-based device-to-device (D2D) discovery in wireless networks.

BACKGROUND

With the proliferation of User Equipment (UE) equipped with one or more cellular modem(s), device-to-device (D2D) communication may become a feature for future network evolvement.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Figure 1:
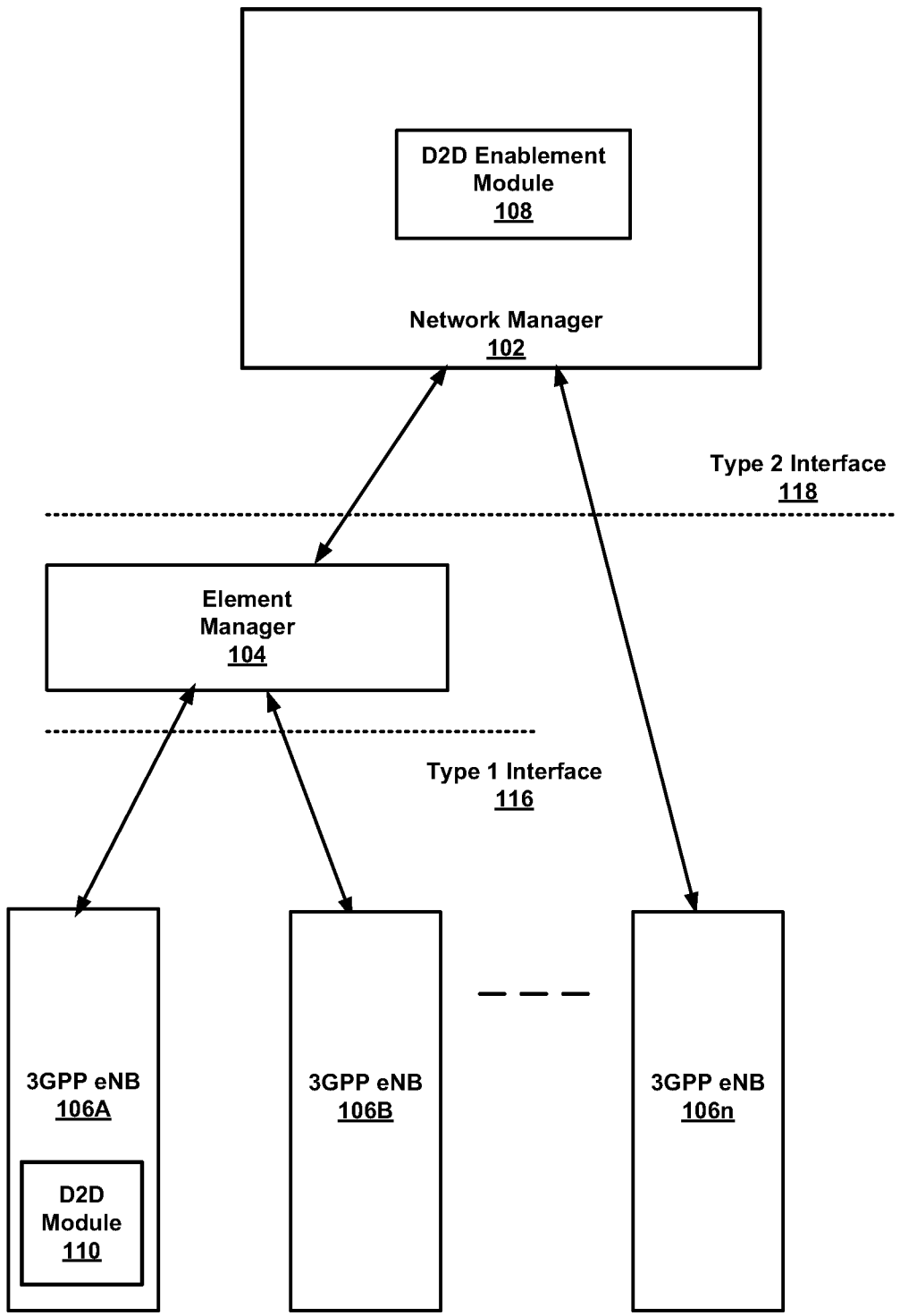
FIG. 1 illustrates an example wireless network system according to various embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure provides devices, systems and methods for User Equipment (UE)-based device-to-device (D2D) discovery in wireless networks. A network manager may be configured to enable D2D discovery in one or more evolved Node Bs (eNBs). The eNB(s) may be configured to periodically allocate discovery resources in the form of D2D Discovery Regions (i.e., D2D DRs) that may be utilized by a UE (User Equipment) to discover other UEs within a neighborhood (i.e., coverage area). Each UE may then be configured to utilize the D2D DRs to advertise their respective identities by, e.g., transmitting a discovery packet. Each UE may be configured to transmit an associated unique identifier as payload in a data packet (i.e., discovery packet). The unique identifier may correspond to, e.g., a MAC (medium access control) address and/or a relatively shorter identifier that is associated with that UE for a period of time, as described herein.

Systems and methods consistent with the present disclosure may be utilized by UEs that are within a network coverage area as well as for partial or out of network coverage scenarios. Partial and out of network coverage scenarios may be configured to utilize a coordinator UE to provide synchronization signals, etc., to UEs outside of the network coverage area.

Each D2D DR may include two orthogonal time-frequency zones. A first orthogonal time-frequency zone is configured to utilize network assistance ("non-contention-based"). A second orthogonal time-frequency zone is configured to proceed without network assistance ("contention-based"). Utilizing network assistance may improve efficiency in the discovery process, as described herein.

A non-contention-based D2D DR (NC-D2D DR) is configured to be accessible to D2D UEs that are in RRC_CONNECTED mode (Radio Resource Control connected mode). The eNB is configured to allocate periodic resources for transmission of discovery signals. One or more hopping mechanisms may be applied with additional configuration from the eNB or without additional configuration (i.e., may be predefined) configured to provide half-duplex UEs opportunities to discover other D2D UEs.

A contention-based D2D DR (C-D2D DR) is, in general, available to all D2D UEs (including out of coverage UEs). Different priorities may be implemented based, at least in part, on whether the UE is in RRC_IDLE mode or out of network area coverage. Restrictions on transmissions from RRC_CONNECTED UEs in the C-D2D DR may be imposed as well, depending on use cases and scenarios. In the C-D2D DR, the UEs are configured to follow a purely contention-based transmission of discovery signals, as described herein.

Partitioning the NC-D2D DRs and C-D2D DRs may be accomplished using FDM (Frequency Division Multiplexing) and/or TDM (Time Division Multiplexing). Both NC-D2D DRs and C-D2D DRs may include one or more periodic discovery zones, with each discovery zone including a relatively small number of RBs (Resource Blocks) in frequency and a relatively larger number of subframes in time. The eNB may be configured to semi-statically signal the partitioning of these D2D DRs using RRC (Radio Resource Control) signaling for within network coverage scenarios. For the partial network coverage scenario, such information may be forwarded by the coordinator UE to the UEs that are outside network coverage. For out of coverage scenarios, UEs may be configured to utilize C-D2D DRs.

Thus, UEs may be configured to perform D2D discovery operations on a non-contention basis scheduled by an eNB and/or on a contention basis.

FIG. 1 illustrates an example wireless network system 100 according to various embodiments of the present disclosure. The system 100 generally includes a plurality of hardware devices, hardware platforms and associated signaling, functionality, and definition which may generally comply with, or otherwise be compatible with, the Third Generation Partnership Project (3GPP) Long Term Evolution (LTE) and/or LTE-Advanced (LTE-A) based wireless network standard, including current, previous and future versions of that standard. These may include, for example, 3GPP TS 36.212: "Evolved Universal Terrestrial Radio Access (E-UTRA); Multiplexing and channel coding", 3GPP TS 36.211: "Evolved Universal Terrestrial Radio Access (E-UTRA); Physical channels and modulation", 3GPP TS 36.213: "Evolved Universal Terrestrial Radio Access (E-UTRA); Physical layer procedures, 3GPP TS 36.331: "Evolved Universal Terrestrial Radio Access (E-UTRA); Radio Resource Control; Protocol specification", 3GPP TS 36.304: "Evolved Universal Terrestrial Radio Access (E-UTRA); User Equipment (UE) procedures in idle mode", 3GPP TS 23.221, 3GPP TS 24.301, 3GPP TS 36.413, 3GPP TS 33.401, etc. Reference to hardware platforms and/or software modules (e.g., UE, eNodeB, eNB, etc.) and associated signaling and functionality, as used herein, may be generally defined by the aforementioned 3GPP standards, and/or derivatives thereof.

The wireless network 100 includes a network manager (NM) 102, at least one element manager (EM) 104, and a plurality of eNodeBs (eNBs) 106A, 106B, . . . , 106(n). In this example, eNB 106A and 106B are configured to communicate with the NM 102 via the EM 104, and eNB 106n is configured to communicate with the NM 102, in which case, in some embodiments, eNB 106n may include an EM to facilitate such communication. Each eNB 106A, 106B, . . . , 106n is generally configured to provide cell coverage areas (not shown in this Figure). In some embodiments, one or more eNBs may be operable to cover a single cell area, while in other embodiments, at least one eNB may be operable to cover multiple cells or sectors, while in other embodiments, at least one cell may be partitioned so that multiple eNBs cover that cell. While this is a simplified example, for illustration purposes, it will be appreciated that in practice any configuration of eNBs, UEs and WLAN APs of various types may be deployed and may provide coverage extending to any number or areas, regions or sectors. User equipment (UE, not shown) may typically be configured to transmit voice and data traffic to and from the eNB 106. NM 102 may be configured to communicate with the eNBs in the network 100, e.g., to monitor performance and/or to enable D2D discovery, as will be described in greater detail below.

The NM 102 typically includes computer systems and/or software applications configured to provide and facilitate network support functions to network operators or providers. These support functions may include configuration, performance monitoring and fault detection, and coordinating various operations of the EM 104 and/or eNBs 106A, 106B, . . . , 106n. The EM 104 may be configured to provide both element and domain management function for a sub-network, and to provide a set of end-user functions for management of a set of related types of network elements, for example, the eNBs 106A, 106B, . . . , 106n. The NM 102, the EM 104, and eNB 106n may include interface circuitry to enable communication. In one example, the interface may include a type 2 interface 118. The type 2 interface 118 may be defined by the aforementioned 3GPP standard and/or a user defined (e.g., proprietary) interface protocol. The EM 104 and the eNBs 106A and 106B may also include interface circuitry to enable communication there between. In one example, the interface may include a type 1 interface 116. The type 1 interface 116 may be defined by the aforementioned 3GPP standard and/or a user defined (e.g., proprietary) interface protocol. The EM 104 may also be configured to provide message translation between the type 1 interface 116 and the type 2 interface 118.

NM 102 may include a D2D enablement module 108 configured to communicate with the eNBs 106A, 106B, . . . , 106n to enable D2D discovery, as described herein. One or more of the eNBs 106A, 106B, . . . , 106n may include a D2D module 110 configured to implement D2D discovery, as described herein.

Figure 2:
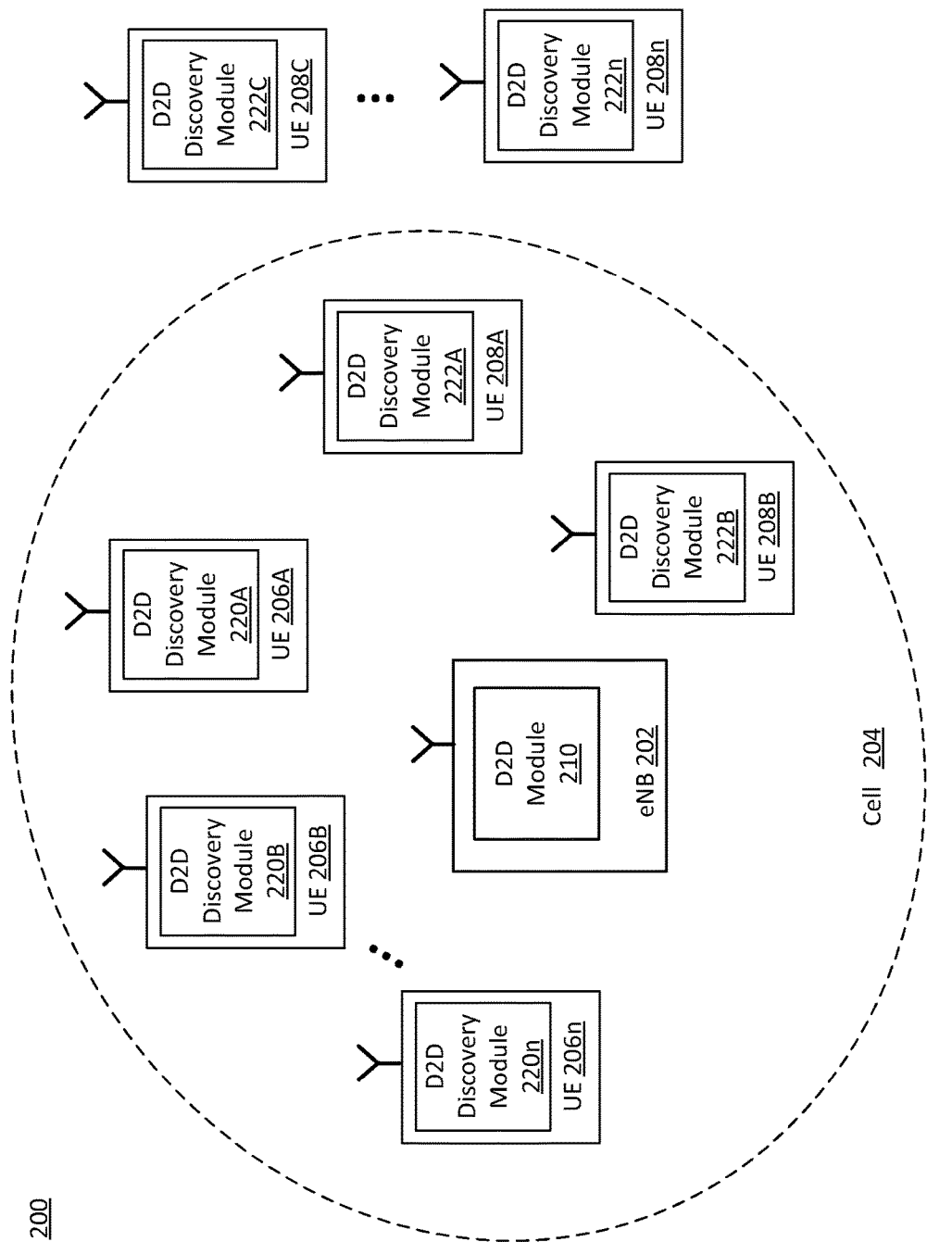
FIG. 2 illustrates an example wireless network system diagram according to various embodiments of the present disclosure.

FIG. 2 illustrates an example wireless network system diagram 200 according to various embodiments of the present disclosure. The example wireless network 200 is shown in a simplified form to include an eNB 202, UEs 206A, 206B, . . . , 206n and UEs 208A, 208B, 208C, . . . , 206n. The eNB 202 includes D2D module 210 configured to provide D2D discovery resources, as described herein. Discovery resources include non-contention-based D2D discovery regions (NC D2D DRs) and/or contention-based D2D discovery regions (C-D2D DRs). Each D2D discovery region may include a plurality of orthogonal time-frequency zones. The eNB 202 provides cell coverage area 204. In this example, UEs 206A, 206B, . . . , 206n are in RRC_CONNECTED mode, UEs 208A, 208B are in RRC_IDLE mode and UEs 208C, . . . , 206n are out of network. UEs 206A, 206B, . . . , 206n and UEs 208A, 208B, 208C, . . . , 206n are enabled for D2D discovery, as described herein. Each UE 206A, 206B, . . . , 206n, 208A, 208B, 208C, . . . , 208n may include a respective D2D discovery module 220A, 220B, . . . , 220n, 222A, 222B, 222C, . . . , 222n, respectively. UEs 206A, 206B, . . . , 206n may be configured for non-contention-based D2D discovery and/or contention-based D2D discovery, as described herein. UEs 208A, 208B, 208C, . . . , 206n may be configured for contention-based D2D discovery, as described herein.

Non-Contention-Based D2D Discovery

In an embodiment, an eNB, e.g., eNB 202, may be configured to implement non-contention-based D2D discovery. eNB 202 is configured to assign an RB (resource block) pair (e.g., 12×14 REs (resource elements)) within the NC-D2D DR for transmission of D2D discovery signals. In this embodiment, eNB 202, via D2D module 210, is configured to assign resources for discovery payload transmission similar to semi-persistent scheduling (SPS). For example, eNB 202 may configure an RRC_CONNECTED D2D enabled UE, e.g., UE 206A, at an RRC layer with an appropriate D-C-RNTI (discovery-cell-radio network temporary identifier)) that is used to scramble a CRC (cyclic redundancy check) of a related PDCCH (physical downlink control channel) transmission to initiate a semi-persistent resource allocation. The RRC (re-)configuration message may include information related to a resource allocation interval (and/or periodicity) corresponding to a size and periodicity of the NC-D2D DRs.

In some embodiments, eNB 202 may configure the periodicity in a UE-specific manner. For example, the periodicity may be configured to allow transmission of discovery information from selected D2D UEs rather than all D2D UEs. Such selected UEs may be selected based, at least in part, on a type of D2D services. In another example, the periodicity may be configured to allow a particular UE to transmit on selected NC-D2D DRs and not on all cell-specific NC-D2D DRs. eNB D2D module 210 may be configured to release allocated resources similar to an SPS release operation, i.e., explicitly, via Layer 1 signaling using D-C-RNTI indicating SPS release and/or implicitly, via an appropriate release mechanism.

In an embodiment, eNB may configure each UE, e.g., UE 206A, via D2D discovery module 220A, to transmit D2D data packets (i.e., discovery packets) using an UL SC-FDMA (uplink single carrier-frequency division multiple access) multi-user transmission. The D2D discovery module 220A may be configured to utilize the reference signals (e.g., used for channel estimation for demodulation) associated with a PUSCH DM-RS (physical uplink shared channel demodulation reference signal). Base sequences and cyclic shifts for UL DM-RS sequence generation may be fixed (e.g., may be set to 0) for all UEs, e.g., to allow discovery of UEs across cell boundaries and avoid additional blind decodings at the receiving D2D UEs. For example, a transmitting UE, e.g., UE 206A, may be configured to randomly select one of two available orthogonal cover codes (OCC). In another example, the D2D module 210 may be configured to assign transmitting UEs, e.g., UEs 206A, . . . , 206n, selected DM-RS sequences mapped to appropriate symbols (e.g., symbols 4 and 11 for normal cyclic prefix) within a subframe. Thus, orthogonality between two transmissions may be provided, discovery across cell boundaries (no dependence on physical cell ID) may be supported and a relatively large number of blind decodings at receiving D2D UEs may be avoided. For example, to transmit a 48 bit MAC ID+16 bit CRC, and assuming QPSK (quadrature phase shift keying) transmissions, the error correcting coding rate is 64/(12*14−12)/2.

In another embodiment, each UE, e.g., UE 206A, may be configured to transmit according to a DL (downlink) transmission mode (TM) 9 MU-MIMO (multiple user-multiple input multiple output) format. For example, D2D discovery module 220A (UE 206A) may be configured to randomly select port 9 or port 10 for RS (reference signal) transmission. In another example, eNB 202 may be configured to assign the RS ports to be used by the UEs when transmitting in the NC-D2D DR. To allow discovery of UEs across cell boundaries and avoid additional blind decodings at the receiving D2D UEs, the sequence initialization for the RS may be independent of the physical cell ID (i.e., $N_{ID}^{cell}=0$ for all D2D data packet transmissions using DL TM 9) with $n_{SCID}=0$.

In general, UEs that are not transmitting in a subframe associated with a D2D DR, e.g., UEs 206B, . . . , 206n when UE 206A is transmitting, may be configured to listen to other nearby discovery payload transmissions. The listening UEs 206B, . . . , 206n are configured to decode the payload in order to discover and/or identify a transmitting UE, e.g., UE 206A. Each listening UE 206B, . . . , 206n may be configured to decode a maximum of two packets, i.e., for a UE that includes two receive antennas.

In an embodiment, transmission of acknowledgements (ACKs) from the discovering UE may be provided. ACKs may be transmitted using PUCCH (physical uplink control channel) format 1 (maximum 36 ACKs per discovery packet). The ACK resources may be mapped directly from UE discovery packets. ACK may be configured to facilitate two-way handshaking.

Mapping discovery resources and hopping mechanisms is configured to provide frequency diversity and allow discovery by UEs configured for half-duplex communication. eNB 202 (via D2D module 210) is configured to allocate an initial discovery resource to each UE 206A, 206B, . . . , 206n, as described herein. Thus, the initial discovery resource may be known to both the eNB 202 and the UE 206A, 206B, . . . , 206n. The eNB 202 and/or the UE 206A, 206B, . . . , 206n may then be configured to implement discovery zone by discovery zone hopping that provides frequency diversity and provides opportunity for half-duplex configured UEs to participate in discovery.

For example, a number of individual resources included in a NC-D2D DR may correspond to $N_f$ and $N_t$ in frequency and time dimensions, respectively, where $N_t \geq N_f$. A current time-frequency resource utilized by a UE, e.g., UE 206A, to transmit a discovery packet in a discovery zone may then be $n_t$ ($0 \leq n_t \leq N_t-1$) and $n_f$ ($0 \leq n_f \leq N_f-1$). The time frequency resource for UE 206A in a next discovery zone may then be determined as:

$$\text{next\_}n_f=(n_f+\text{floor}(N_f/2))\text{modulo}N_f$$

$$\text{next\_}n_t=(n_t+n_f)\text{modulo}N_t.$$

where "floor" corresponds to the largest integer less than the operand ($N_f/2$). Thus, frequency selective diversity may be provided and discovery by half-duplex-configured UEs may be facilitated.

In an embodiment, eNB 202 is configured to maintain a record of the allocations of each D2D UE-assigned resource in the NC-D2D DR in order to derive the resource allocation for the next discovery zone. Thus, eNB intervention may be limited and signaling between eNB and UEs may be reduced.

In another embodiment, a hopping mechanism may be specified based, at least in part, on the resource location (i.e., time-frequency index) of the initial allocation, a specified periodicity of discovery zones that may be RRC configured and/or configured during the initial allocation, a system frame number (SFN), and the subframe number. Thus, the eNB 202 would only need to know the initial allocation position (that is configured by the eNB itself) and would not need to track each UE's discovery resource location as the UE evolved from zone-to-zone. For example, let proSeDiscoveryTxInterval be the periodicity of discovery resources allocated for a particular D2D UE, e.g., UE 206A. The periodicity may be the same as the periodicity of discovery zones in the NC-D2D DR or an integer multiple of the periodicity of the discovery zones. In other words, some UEs may be allocated resources for discovery data packet transmission every K (K≥1) discovery zones within the NC-D2D DR. As above, $N_f$ and $N_t$ are the number of individual resources within a NC-D2D DR in frequency and time dimensions respectively with $N_t \geq N_f$. After a UE, e.g., UE 206A, is initially configured, by, e.g., eNB 202, for periodic discovery data packet transmission in the NC-D2D DR, the UE 206A may determine sequentially that the $N^{th}$ resource allocation occurs in the subframe for which:

$$(10*SFN+\text{subframe})=[(10*SFN_{start\ time}+\\ \text{subframe}_{start\ time})+\\ N*\text{proSeDiscoveryTxInterval}+(N*n_{f\_start\ time})\\ \text{modulo}N_t]\text{modulo}10240,$$

where $SFN_{start\ time}$, $\text{subframe}_{start\ time}$, and $n_{f\_start\ time}$ are the SFN, subframe, and position in frequency (e.g., allocated PRB (physical resource block) pair, etc.) respectively, at the time of initial allocation/configuration. The resource location in frequency dimension corresponding to the $N^{th}$ resource allocation may also be determined from the initial allocation position as:

$$\text{next\_}n_f=(n_{f\_start\ time}+(N*\text{floor}(N_f/2)))\text{modulo}N_f)\text{modulo}N_f.$$

Thus, the eNB 202 may be configured to implement resource mapping and hopping for discovery based on NC-D2D DRs based, at least in part, on the initial allocation information and the index of the latest (i.e., most recent) resource allocation for each UE.

Of course, the foregoing examples are merely representative of techniques configured to provide frequency diversity and/or facilitate D2D discovery by UEs configured for half-duplex communication, and of course, the present disclosure is not limited by these examples.

Contention-Based D2D Discovery

In an embodiment, an eNB, e.g., eNB 202 (via D2D module 210), may be configured to implement contention-based D2D discovery. UEs 208A, . . . , 208n are configured for contention-based D2D discovery. For example, UEs 208A, 208B may be in RRC_IDLE mode and UEs 208C, ..., 208n may be out of coverage area 206. UEs 206A, ..., 206n may also be configured for contention based D2D discovery. Thus, UEs 206A, ..., 206n may participate in non-contention-based and/or contention-based discovery. UEs configured for contention-based discovery may be configured to select a discovery resource element from a C-D2D DR to use for transmitting a respective discovery packet (and discovery payload). A size of the discovery resource element may vary. For example, a discovery resource element may include one or more PRBs (physical resource block).

eNB 202, via D2D module 210, is configured to allocate the periodic discovery zones that correspond to the C-D2D DR (i.e., the contention-based D2D discovery region). A UE, e.g., UE 208A, via D2D discovery module 222A, is configured to select one or more of the PRB pairs (e.g., 12×14 Res) (i.e., discovery resource element) included in the C-D2D DR for transmitting its associated discovery packet. Similar to NC-D2D DR, in an embodiment, UE 208A, via D2D discovery module 222A, may be configured to utilize an UL SC-FDMA format for transmission of its discovery packet, e.g., the reference signals (for channel estimation for demodulation) associated with a PUSCH DM-RS, as described herein. If the discovery packet includes a unique identifier, e.g., MAC ID, the payload may include 48 bit MAC ID plus 16-bit CRC. Assuming QPSK transmissions, the coding rate of forward error correction is 64/12*14−12)/2. In another embodiment, similar to NC-D2D DR each UE, e.g., UE 208A, may be configured to transmit according to a DL transmission mode (TM) 9 MU-MIMO format. For example, each UE may be configured to randomly select port 9 or port 10 for RS transmission.

In an embodiment an eNB, e.g., eNB 208A (via D2D discovery module 222A) may be configured to select one or more PRB pairs utilizing a Slotted Aloha technique for transmitting its discovery packet. The PRB(s) may be included in a C-D2D DR. For UEs configured to decode one packet, according to conventional Slotted Aloha, maximum throughput is $e^{-1}$, and the optimal arriving rate is 1/slot. UEs that include two receive antennas may be configured to decode two packets. Transmission may then be successful with one or two packets. Assuming an optimal Poisson arriving rate, the probability of no packet in one slot is $e^{-1}$, the probability of one packet in one slot is $e^{-1}$, the probability of two packets in one slot is 0.5 $e^{-1}$, and the probability of greater than two packets per slot is $1-e^{-1}-e^{-1}-e^{-1}/2=8\%$. Therefore the maximum throughput is 2/e.

UEs, e.g., UE 208B, ..., 208n that are not transmitting may be configured listen to the transmissions on the D2D discovery resource and to decode the payload. Some UEs may include two receive antennas. UEs with two receive antennas may be configured to decode two discovery packets and may be configured to decode more than two packets if interference mitigation techniques are applied.

Although acknowledgement is not required, a UE, e.g., UEs 208B, ..., 208n, may be configured to transmit an ACK in response to a discovery packet. The ACK may be transmitted using PUCCH format 1 (maximum 36 ACKs per discovery packet). The ACK resources may be mapped directly from the UE discovery packets.

Figure 3A:
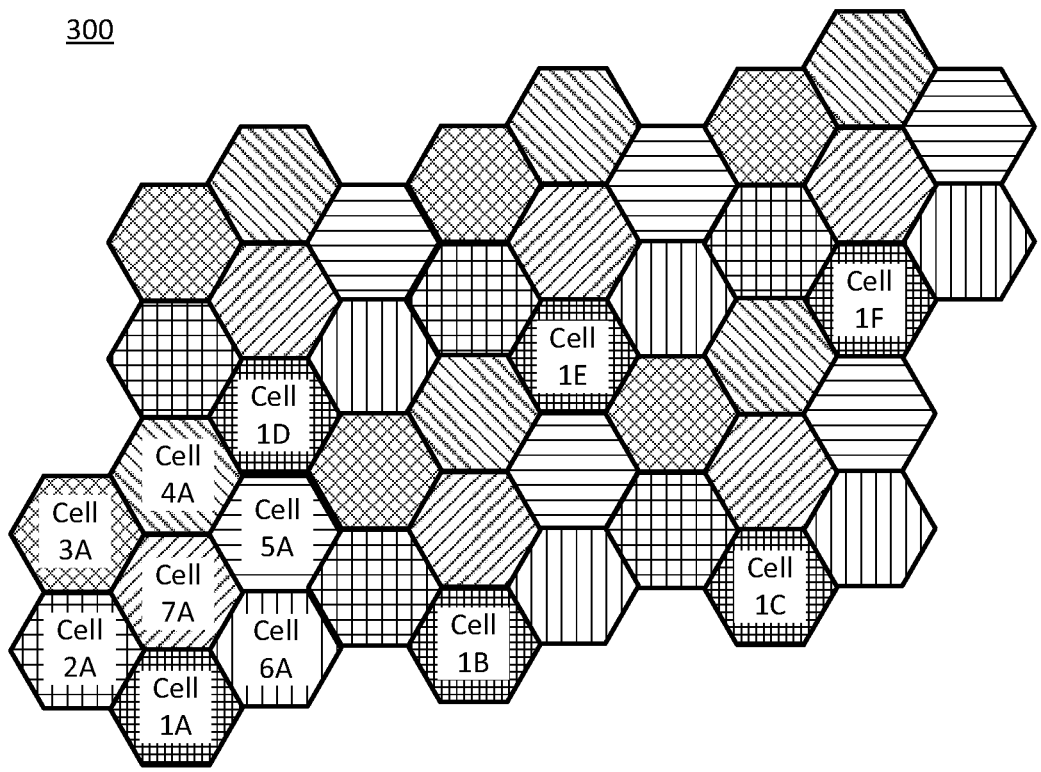
FIGS. 3A and 3B illustrate two example spatial reuse configurations consistent with the present disclosure.
Figure 3B:
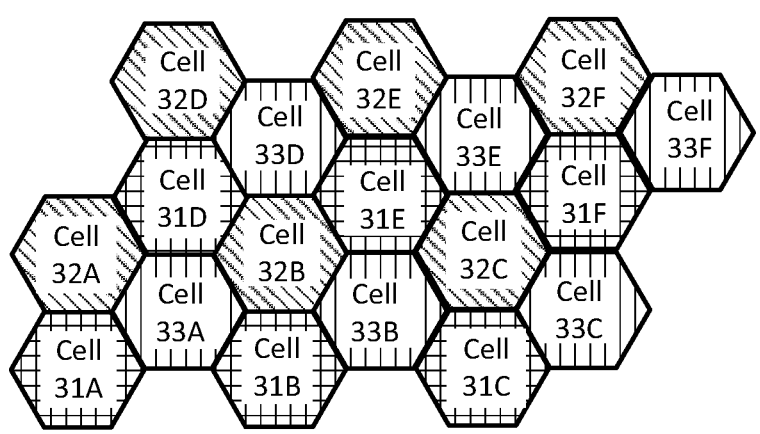

FIGS. 3A and 3B illustrate two example spatial reuse configurations 300, 350 consistent with the present disclosure. Reuse configuration 300 illustrates a 7 cell reuse plan and reuse configuration 350 illustrates a 3 cell reuse plan. In C-D2D DR, spatial reuse may be improved by discovery region planning between different cells. Since the DR is allocated by an eNB, an eNB, e.g., eNB 202, may be configured to allocate different RBs in frequency among nearby eNBs. An eNB may be configured to communicate with nearby eNBs (not shown in the Figure) via, e.g., an element manager (e.g., element manager 104 of FIG. 1). When distances between eNBs are relatively small, higher reuse may be implemented, e.g., the 7 cell reuse plan as shown in reuse configuration 300. A group of seven cells may include, for example, cells 1A, ..., 7A. For example, if $N_f$ RBs are used for discovery zone, then each frequency grouping (e.g., cells 1A through 1F) may use $N_f/7$ RBs. In another example, if the distance between eNBs is relatively large, 3 cell reuse allocation may be implemented as shown in reuse configuration 350. Each frequency grouping (e.g., cells 31A through 31F) use $N_f/3$ non-overlapping resources. For example, eNBs associated with cells 31A through 31F may be configured to allocate RBs 1-3, eNBs associated with cells 32A through 32F may be configured to allocate RBs 4-6 and eNBs associated with cells 33A through 33F may be configured to allocate RBs 7-9 of a C-D2D DR. Thus, a likelihood of collisions may be reduced for UEs operating near cell boundaries. The idle mode UEs, e.g., UE 208A, 208B, may be configured to use the discovery resources allocated by its camping eNB, e.g., eNB 202.

In another embodiment, a UE, e.g., UE 206A using D2D discovery module 220A and/or UE 208A using D2D discovery module 222A, may be configured to initially transmit its associated unique identifier and to transmit a relatively shorter identifier ("short ID") after full unique identifiers have been exchanged by participating UEs. Sending the full data payload (unique ID plus CRC, etc.) may consume a relatively large amount of UE resources. On the other hand, once the full, unique ID is known by the other UEs, there is no need to send the full ID anymore since a temporary, relatively shorter ID that uniquely identifies the UE within the neighborhood may be sufficient. Therefore, the UE 206A, 208A may be configured to send a sequence carrying the short ID to save overhead (and improve efficiency) after the full IDs (e.g., included in the discovery packets) are exchanged among the UEs. While this embodiment is described in the context of contention-based open discovery, in other embodiments, the overhead reduction described herein may be applied with straightforward modifications for non-contention-based discovery.

A UE e.g., UE 206A using D2D discovery module 220A and/or UE 208A using D2D discovery module 222A, may be configured to perform the discovery process in two operations. The first operation may include sending data packets (i.e., discovery packets) that include the full ID information (e.g., unique ID including 48 bit MAC address plus CRC, etc.) and a mapping of the full ID to a temporary ID (i.e., short ID, temp ID) that includes relatively less information than the full unique ID. Full ID corresponds to the unique ID and the temporary ID corresponds to a short ID. Each UE 206A, 208A may be configured to transmit the discovery data packets periodically with a periodicity $T_{packet}$. The second operation may include a keep alive sequence. Between the instances of discovery packet transmission, each UE 206A, 208A may be configured to periodically transmit the temp ID via the transmission of a keep alive sequence with a periodicity of $T_{seq}$, with $T_{seq}<T_{packet}$ (e.g., $T_{packet}=m*T_{seq}$, with m>1). Thus, the keep alive sequence may include the temp ID.

Figure 4:
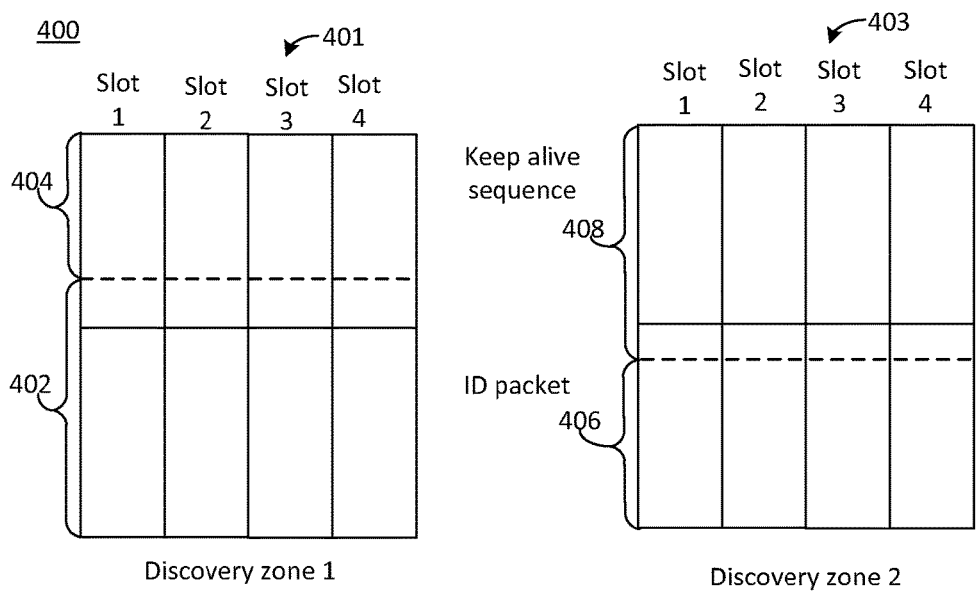
FIG. 4 illustrates an example partition of discovery zones according to one embodiment of the present disclosure.

FIG. 4 illustrates an example partition 400 of discovery zones according to one embodiment of the present disclosure. In this embodiment, the discovery zone in the C-D2D DR may be further divided (i.e., partitioned) into an ID packet zone (e.g., configured for unique ID(s)) 402 and a keep alive sequence zone (e.g., configured for temp ID(s)) 404. For example, a partition may be semi-statically configured by eNB 202 for in network scenarios. In another example, a coordinating UE, e.g., UE 208A, UE 208C, configured for partial and out of network coverage scenarios, respectively, may configure the partition. The eNB 202 and/or coordinating UE 208A using D2D discovery module 222A and/or UE 208C using D2D discovery module 222C may be configured to optimize the partition based, at least in part on, characteristics of D2D discovery traffic. For example, when new D2D discovery requests/events are relatively more prevalent, the size of the ID packet (i.e., full unique ID data packet) zone 402 may be increased and the size of the keep alive sequence zone 404 may be decreased, as illustrated by discovery zone 401. In another example, when the D2D discovery activity is relatively stable (i.e., scenarios with relatively fewer new D2D discovery requests/events), the size of the keep alive sequence zone 408 may be increased and the size of the ID packet zone 406 may be decreased, as illustrated by discovery zone 403.

In an embodiment, a protocol for transmitting the discovery data packets with a periodicity of $T_{packet}$, and transmitting keep alive sequences with a periodicity of $T_{seq}$ between the discovery data packet transmissions may be enhanced by an adaptive transmission policy for discovery data packets. The adaptive transmission policy may be configured to include additional information related to the transmitting UE, e.g., UEs 206A, 208A, in the discovery data packets. For example, one or more management packets may be included in the ID packet zone. The management packets may include management information related to the transmitting UE and/or its neighborhood. Management information may include status indicators related to the transmitting UE. For example, the status "new" may indicate that the transmitting UE has newly joined the neighborhood. Broadcasting this status may trigger the other UEs in the neighborhood to introduce themselves (e.g., to transmit their respective identifiers). In another example, the status "old" may indicate that the transmitting UE, e.g., UE 208A, has successfully joined the neighborhood. The UE 208A may thus be aware of other UEs in the neighborhood. Broadcasting this status may stop the other UEs in the neighborhood from continuing to transmit introductory information. In another example, the status "leaving" may indicate that the UE is moving and will likely leave the neighborhood. Broadcasting this status may let the other UEs in the neighborhood release resources such as a sequence detection hypothesis that may have been reserved for the leaving UE. In another example, the status "sleeping" may indicate that the transmitting UE will sleep and wake up with some period. Broadcasting this status may let the other UEs in the neighborhood temporarily release resources such as sequence detection hypothesis reserved for the sleeping UE.

Figure 5:
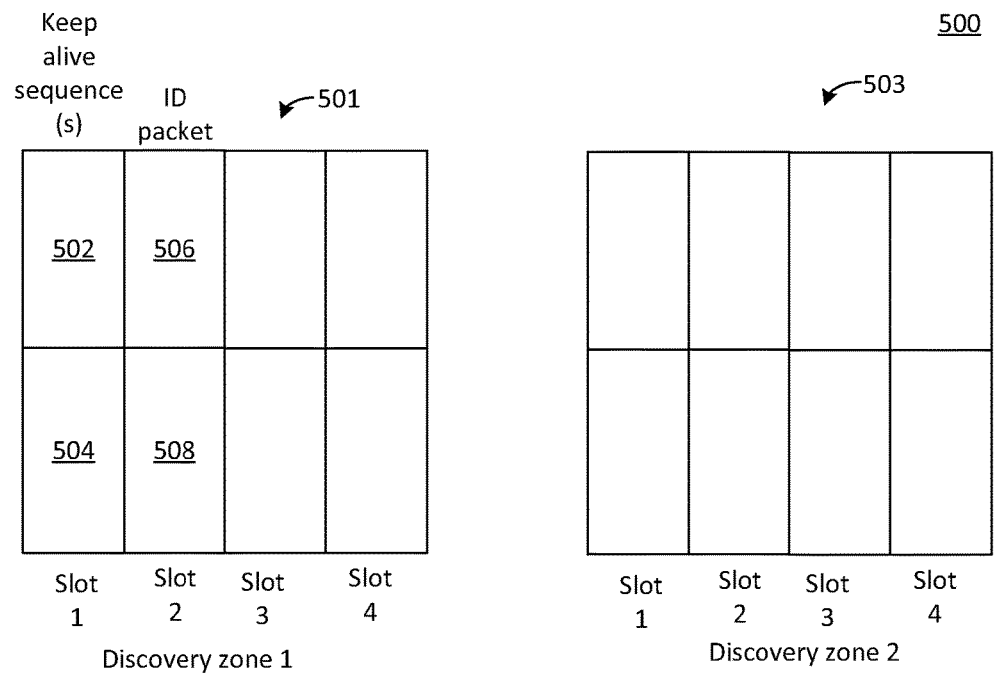
FIG. 5 illustrates another example resource allocation for discovery zones consistent with one embodiment of the present disclosure.

FIG. 5 illustrates another example 500 resource allocation for discovery zones consistent with one embodiment of the present disclosure. In this embodiment, an ID packet may be combined with a sequence transmission. In this embodiment, the sequence (i.e., temp ID) may not be explicitly specified in the data packet. After detection, the sequence may be used as preamble for channel estimation of the packet. In this embodiment, each discovery zone, e.g., discovery zones 501, 503 in the D2D DR may not be explicitly partitioned into two separate zones. Instead, for a specific D2D UE, e.g., UE 208A, during instances of keep alive sequence-only transmission, the data packet may not be transmitted. Thus, improved energy efficiency may be achieved as well as less interference from transmission of full discovery packets. Improved D2D discovery user capacity may be achieved as long as selection of keep alive sequences facilitate a relatively higher level of spatial multiplexing than transmission of discovery packets.

For example, in operation and considering FIG. 5, for a first RB pair in a first subframe (e.g., RB 502 and RB 504 of slot 1 in discovery zone 501), two UEs, e.g., UEs 208A, 208B, may be transmitting keep alive sequences, and one UE, e.g., UE 206A, may sending a discovery packet (i.e., full ID). In this example, it is assumed that the keep alive messages are relatively small compared to the discovery packet. Each of the three UEs 206A, 208A, 208B may be configured to send their respective sequences (i.e., temp IDs) in the first slot, i.e., 502 and 504, and the third UE 206A may be configured to send the data packet in the second slot, i.e., 506 and 508. The data packet may include the 48 bit MAC ID+CRC. A UE, e.g., UE 206B, that may listening on this RB pair may detect all three sequences in the first slot, and may try to decode the data packet using the three sequences as preamble for channel estimation. One decoding may provide a successful CRC check, then the unique ID and sequence associated with the successful CRC check may be mapped together. The receiving (i.e., listening) UE 206B may be configured to attempt the decoding process three times, increasing its complexity. If a fourth UE, e.g., UE 206n, is also transmitting a sequence together with data payload, then it may be difficult for the receiving UE 206B to decode both packets since the blind detecting includes three tries (assuming one packet, this might yield successful decoding if the other data packet is relatively weak) plus six tries (assuming two packets and decode two packets together)=nine tries.

Management information may further include an indicator related to whether the ID mapping is single or multiple. A single ID mapping indicator is configured to indicate that the packet includes one ID mapping between one full ID and one sequence (i.e., temp ID). A multiple ID mapping indicator is configured to indicate that the packet includes a plurality of ID mappings between a plurality of full IDs and a plurality of sequences.

For example, in operation, when a UE, e.g., UE 206B and/or UE 208B, initiates the D2D discovery process, the UE is configured to transmit its full ID in the ID packet zone. The ID packet information may thus include a 48 bit unique MAC address, an associated temp ID used for sequence transmission and CRC. Management information, e.g., new and/or leaving status information, may be included for a joining or leaving UE. In another example, in operation, when a UE is moving and likely to leave the neighborhood, the UE may be configured to announce its leaving by including the leaving status in the management information. Remaining UEs may be configured to terminate the mapping between the full ID and the sequence (i.e., short ID) for the leaving UE and to, thus, make the sequence available to the other UEs. Further, the other UEs may be configured to remove this sequence from the detection hypothesis so that a false alarm rate may be reduced.

In another example, when a UE joins a new group, joining status information may be expressed in a packet so that the other UEs know this UE is new and the other UEs should introduce themselves. In other words, all the UEs that are already in the neighborhood may start sending their own IDs to the new UE. This introduction may be performed in a distributed fashion. For example, each of the old UEs may randomly select one of the resources in the ID packet zone and send its associated ID packet. In another example, one or more UEs may be configured to send a list of mappings of the identified UEs currently in the neighborhood. The list of mappings may be included in one ID packet. Since the list of mapping maintained by an old UE should include mappings for the UEs in the neighborhood (i.e., the neighbors), the list should be complete. After receiving one or more lists, the new UE may convert its status from new to old and notify the other UEs so that the other UEs may stop introducing themselves. In an embodiment, a rule may be defined to map the existing UE to use certain resources to transmit ID to the new UE, so throughput can be improved.

Resource assignment/mapping and hopping designs for the discovery packet-only transmission protocols described herein, may be extended to the protocols with discovery packet and keep alive sequence transmission by considering appropriate assignment/mapping of the keep alive sequences.

Of course the foregoing examples are merely representative of possible values of RSRP difference thresholds, and of course, the present disclosure is not limited by these examples.

Thus, a plurality of UEs may be configured to perform D2D discovery. An eNB may be configured to allocate non-contention-based D2D discovery regions (NC-D2D DRs) and/or contention-based D2D discovery regions (C-D2D-DRs). RRC_CONNECTED UEs may be configured to perform non-contention-based discovery and any D2D-enabled UE in a neighborhood may be configured to perform contention-based D2D discovery.

Figure 6:
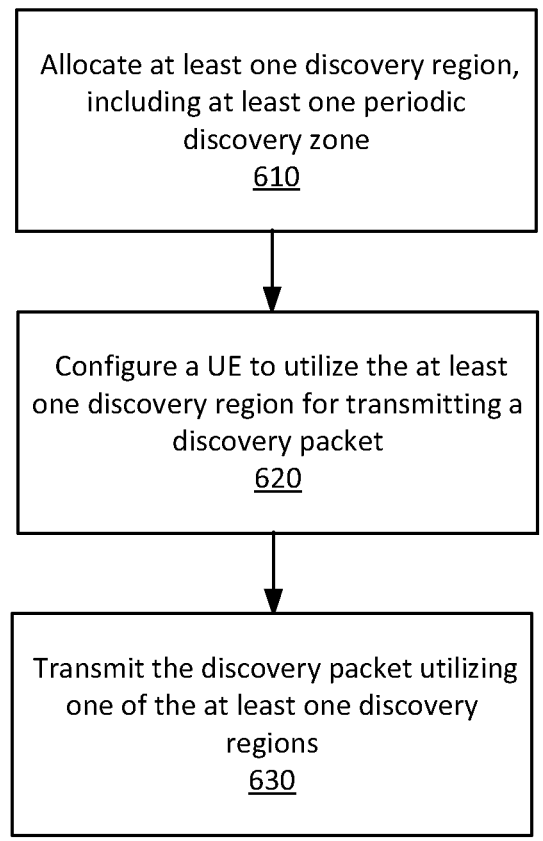
FIG. 6 illustrates a flowchart of example operation consistent with one embodiment of the present disclosure.

FIG. 6 illustrates a flowchart 600 of example operations consistent with various embodiments of the present disclosure. The operations of flowchart 600 may be performed, for example, by eNB 202 and/or a UE, e.g., UE 206A. Operations 610 may include allocating at least one discovery region, including at least one periodic discovery zone. For example, the at least one discovery region may include a non-contention-based D2D discovery region and a contention-based D2D discovery region. A UE may be configured to utilize the at least one discovery region for transmitting a discovery packet at operation 620. Operation 630 may include transmitting the discovery packet utilizing one of the at least one discovery regions.

Figure 7:
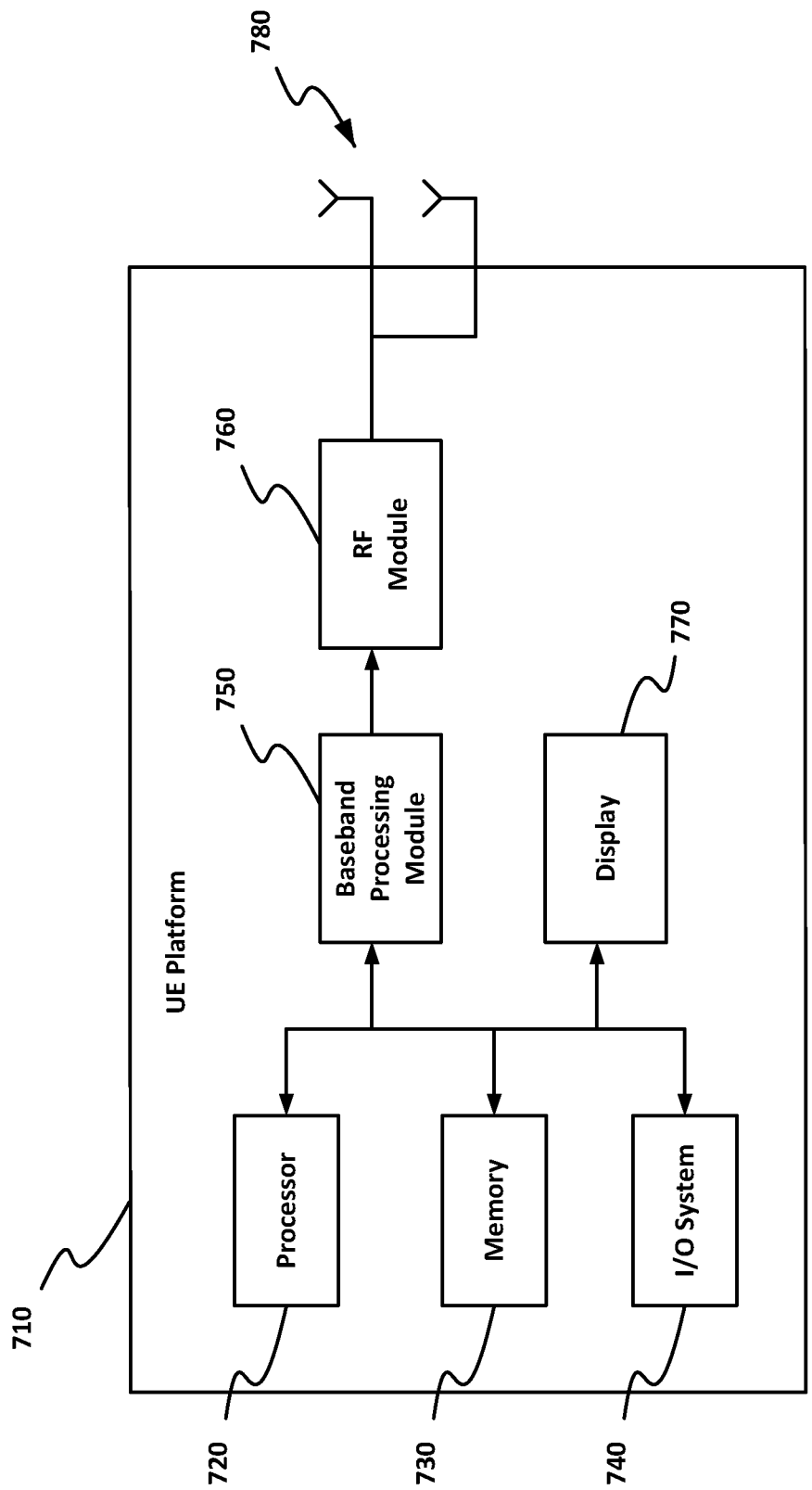
FIG. 7 illustrates a platform of one example embodiment consistent with the present disclosure.

FIG. 7 illustrates a platform configuration 700 of one example embodiment consistent with the present disclosure. For example, UE 214 may correspond to platform 700. The platform 710 may be a mobile communication device, such as, for example, a UE device (smartphone), a tablet, a laptop computing device or any other device configured to transmit or receive wireless signals. In some embodiments, platform 710 may include a processor 720, memory 730, an input/output (I/O) system 740, a display/keyboard or other type of user interface (UI) 770 such as, for example, a touchscreen. Platform 710 may further include a baseband processing module 750 and an RF processing module 760 as well as one or more antennas 780 which may form part of a Multiple Input Multiple Output (MIMO) antenna system. Any number of platforms 700 may transmit or receive signals through RF module 760 and antennas 780 over a wireless network which may be an LTE or LTE-A wireless network.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible storage device, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. An app may be embodied as code or instructions which may be executed on programmable circuitry such as a host processor or other programmable circuitry. A "module", as used in any embodiment herein, may be embodied as circuitry, software, instruction sets, code (e.g., source code, executable code, etc), etc. The circuitry may be embodied as an integrated circuit, such as an integrated circuit chip.

Thus, the present disclosure provides devices, methods, systems and computer-readable storage medium for D2D discovery in wireless networks. The following examples pertain to further embodiments.

According to one aspect there is provided an eNB. The eNB may include a device-to-device (D2D) module configured to allocate at least one D2D discovery region including at least one periodic discovery zone, the at least one periodic discovery zone including a first plurality of resource blocks in frequency and a second plurality of subframes in time, the D2D module further configured to configure a User Equipment (UE) to utilize the at least one D2D discovery region for transmitting a discovery packet.

Another example eNB includes the forgoing components and the at least one D2D discovery region includes at least one of a non-contention-based D2D discovery region and a contention-based D2D discovery region.

Another example eNB includes the forgoing components and the D2D module is configured to partition the at least one D2D discovery regions using at least one of frequency division multiplexing (FDM) and time division multiplexing (TDM).

Another example eNB includes the forgoing components and one D2D discovery region is a non-contention-based D2D discovery region and the D2D module is configured to semi-statically signal a partition of the one D2D discovery region to the UE using Radio Resource Control (RRC) signaling.

Another example eNB includes the forgoing components and the D2D module is configured to configure the UE to utilize at least one of uplink single channel-frequency division multiple access (UL SC-FDMA) and downlink transmission mode 9 multiple user-multiple input multiple output (DL TM 9 MU-MIMO) for transmitting the discovery packet.

Another example eNB includes the forgoing components and one D2D discovery region is a contention-based D2D discovery region and the D2D module is configured to configure the UE to utilize a Slotted Aloha technique for transmitting the discovery packet.

Another example eNB includes the forgoing components and the D2D module is configured to map discovery resources and hopping mechanisms to provide frequency diversity and to facilitate reception of the discovery packet by a half-duplex UE.

According to another aspect there is provided a method. The method may include allocating, by an evolved Node B (eNB), at least one device-to-device (D2D) discovery region including at least one periodic discovery zone, the at least one periodic discovery zone including a first plurality of resource blocks in frequency and a second plurality of subframes in time; and configuring, by the eNB, a User Equipment (UE) to utilize the at least one D2D discovery region for transmitting a discovery packet.

Another example method includes the forgoing operations and further includes transmitting, by the UE, the discovery packet utilizing one of the at least one D2D discovery regions.

Another example method includes the forgoing operations and the at least one D2D discovery region includes at least one of a non-contention-based D2D discovery region and a contention-based D2D discovery region.

Another example method includes the forgoing operations and further includes partitioning, by the D2D module, the at least one D2D discovery regions using at least one of frequency division multiplexing (FDM) and time division multiplexing (TDM).

Another example method includes the forgoing operations and one D2D discovery region is a non-contention-based D2D discovery region and further including signaling, by the D2D module, semi-statically a partition of the one D2D discovery region to the UE using Radio Resource Control (RRC) signaling.

Another example method includes the forgoing operations and further includes configuring, by the D2D module, the UE to utilize at least one of uplink single channel-frequency division multiple access (UL SC-FDMA) and downlink transmission mode 9 multiple user-multiple input multiple output (DL TM 9 MU-MIMO) for transmitting the discovery packet.

Another example method includes the forgoing operations and one D2D discovery region is a contention-based D2D discovery region and further including, configuring, by the D2D module, the UE to utilize a Slotted Aloha technique for transmitting the discovery packet.

Another example method includes the forgoing operations and further includes mapping, by the D2D module discovery resources and hopping mechanisms to provide frequency diversity and to facilitate reception of the discovery packet by a half-duplex UE.

Another example method includes the forgoing operations and further includes allocating, by the D2D module, a portion of each of the at least one discovery region according to a cell reuse plan.

According to another aspect there is provided a User Equipment (UE). The UE includes a device-to-device (D2D) discovery module configured to transmit a discovery packet utilizing at least one D2D discovery region, the at least one D2D discovery region including at least one periodic discovery zone, the at least one periodic discovery zone including a first plurality of resource blocks in frequency and a second plurality of subframes in time.

Another example UE includes the forgoing components and the at least one D2D discovery region includes at least one of a non-contention-based D2D discovery region and a contention-based D2D discovery region.

Another example UE includes the forgoing components and one D2D discovery region is a non-contention-based D2D discovery region and the D2D discovery module is configured to receive a semi-static signal from an evolved Node B (eNB), the semi-static signal related to a partition of the one D2D discovery region.

Another example UE includes the forgoing components and the D2D discovery module is configured to utilize at least one of uplink single channel-frequency division multiple access (UL SC-FDMA) and downlink transmission mode 9 multiple user-multiple input multiple output (DL TM 9 MU-MIMO) for transmitting the discovery packet.

Another example UE includes the forgoing components and one D2D discovery region is a contention-based D2D discovery region and the D2D discovery module is configured to utilize a Slotted Aloha technique for transmitting the discovery packet.

Another example UE includes the forgoing components and the discovery packet includes at least one of a unique identifier, UE status information and a sequence for channel estimation.

Another example UE includes the forgoing components and the discovery packet includes at least one of a unique identifier and relatively shorter sequence related to the unique identifier.

According to another aspect there is provided at least one computer-readable storage medium having instructions stored thereon which when executed by a processor cause the processor to perform the operations of the method as described in any of the examples above.

According to another aspect there is provided an apparatus including means to perform a method as described in any of the examples above.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An evolved Node B (eNB) comprising:
device-to-device (D2D) circuitry configured to allocate a plurality of periodic discovery zones for D2D discovery, wherein:
each of the plurality of periodic discovery zones includes a first plurality of resource blocks and a second plurality of subframes;
the D2D circuitry is further configured to configure a User Equipment (UE) to utilize the at least one periodic discovery zone for transmitting a discovery message; and
the plurality of periodic discovery zones are partitioned such that the plurality of periodic discovery zones comprise at least one non-contention based discovery zone that is available to D2D UE's in connected mode with an evolved node B, and at least one contention based discovery zone that is available to all D2D UE's irrespective of their Radio Resource Control (RRC) connection status; and transmitter circuitry to signal the partitioning of the plurality of periodic discovery zones;

wherein the D2D circuitry is further to configure a periodicity of the at least one non-contention based discovery zone in a UE specific manner so as to allow transmission of discovery information from only a subset of said D2D UE's in connected mode on the at least one non-contention based discovery zone rather than all of said D2D UE's in connected mode;

wherein the D2D circuitry is further configured to configure the UE to utilize downlink transmission mode 9 multiple user-multiple input multiple output (DL TM 9 MU-MIMO) for transmitting the discovery message.

2. The eNB of claim 1, wherein the D2D circuitry is configured to partition the plurality of periodic discovery zones using at least one of frequency division multiplexing (FDM) and time division multiplexing (TDM).

3. The eNB of claim 1, wherein the D2D circuitry is further configured to semi-statically signal a partition of the at least one non-contention based discovery zone to the UE using Radio Resource Control (RRC) signaling.

4. The eNB of claim 1, wherein the D2D circuitry is configured to configure the UE to utilize a Slotted Aloha technique for transmitting the discovery message.

5. The eNB of claim 1, wherein the D2D circuitry is further configured to map discovery zone and hopping mechanisms to provide frequency diversity and to facilitate reception of the discovery message by a half-duplex UE.

6. The eNB of claim 1, wherein said D2D circuitry is further configured to select said subset of D2D UE's in a connected mode based at least in part on a type of D2D services.

7. The eNB of claim 1, wherein said at least one non-contention based discovery zone comprises a plurality of non-contention based discovery zones, and said periodicity is configured to allow a particular one of said D2D UE's in connected mode to transmit discovery information only on a selected one of said plurality of non-contention based discovery zones.

8. A method comprising:

allocating, by an evolved Node B (eNB), a plurality of periodic discovery zones for device-to-device (D2D) discovery, wherein:

each of the plurality of periodic discovery zones includes a first plurality of resource blocks and a second plurality of subframes; and the plurality of periodic discovery zones are partitioned such that the plurality of periodic discovery zones comprise at least one non-contention based discovery zone that is available to D2D user equipment (UE's) that are in connected mode with the eNB, and at least one contention based discovery zone that is available to all D2D UE's irrespective of their Radio Resource Control (RRC) connection status;

signaling the partitioning of the plurality of periodic discovery zones; and configuring, by the eNB, a User Equipment (UE) to utilize at least one of the plurality of periodic discovery zones for transmission of a discovery message;

wherein:

said allocating comprises configuring a periodicity of the at least one non-contention based discovery zone in a UE specific manner so as to allow transmission of discovery information from only a subset of said D2D UE's in connected mode on the at least one non-contention based discovery zone rather than all of said D2D UE's in connected mode;

the eNB further comprises D2D circuitry; and the method further comprises: configuring, by the D2D circuitry, the UE to utilize downlink transmission mode 9 multiple user-multiple input multiple output (DL TM 9 MU-MIMO) for transmitting the discovery message.

9. The method of claim 8, further comprising:

transmitting, by the UE, the discovery message utilizing one of the plurality of periodic discovery zones.

10. The method of claim 8, wherein the eNB further comprises D2D circuitry and the method further comprises:

partitioning, by the D2D circuitry, the plurality of periodic discovery zones using at least one of frequency division multiplexing (FDM) and time division multiplexing (TDM).

11. The method of claim 8, wherein signaling the partitioning of the plurality of periodic discovery zones comprises semi-statically signaling a partition of the non-contention based discovery to the UE using Radio Resource Control (RRC) signaling.

12. The method of claim 8, wherein the eNB further comprises D2D circuitry, and the method further comprises, configuring, by the D2D circuitry, the UE to utilize a Slotted Aloha technique for transmitting the discovery message.

13. The method of claim 8, wherein the eNB further comprises D2D circuitry, and the method further comprises:

mapping, by the D2D circuitry discovery zone and hopping mechanisms to provide frequency diversity and to facilitate reception of the discovery packet by a half-duplex UE.

14. The method of claim 8, wherein the eNB further comprises D2D circuitry, and the method further comprises:

allocating, by the D2D circuitry, a portion of each of the plurality of periodic discovery zones according to a cell reuse plan.

15. The method of claim 8, wherein said allocating further comprises selecting said subset of D2D UE's in a connected mode based at least in part on a type of D2D services.

16. The method of claim 8, wherein said at least one non-contention based discovery zone comprises a plurality of non-contention based discovery zones, and said allocating comprises configuring said periodicity to allow a particular one of said D2D UE's in connected mode to transmit discovery information only on a selected one of said plurality of non-contention based discovery zones.

17. A system comprising, one or more storage mediums having stored thereon, individually or in combination, instructions that when executed by one or more processors result in the following operations comprising:

allocating, by an evolved Node B (eNB), a plurality of periodic discovery zones for device-to-device (D2D) discovery, wherein:

each of the plurality of periodic discovery zones includes a first plurality of resource blocks and a second plurality of subframes; and the plurality of periodic discovery zones are partitioned such that the plurality of periodic discovery zones comprise at least one non-contention based discovery zone that is available to D2D user equipment (UE's) that are in connected mode with the eNB, and at least one contention based discovery zone that is available to all D2D UE's irrespective of their Radio Resource Control (RRC) connection status;

signaling the partitioning of the plurality of periodic discovery zones; and configuring, by the eNB, a User Equipment (UE) to utilize at least one of the plurality of periodic discovery zones for transmission of a discovery message;

wherein:

said allocating comprises configuring a periodicity of the at least one non-contention based discovery zone in a UE specific manner so as to allow transmission of discovery information from only a subset of said D2D UE's in connected mode on the at least one non-contention based discovery zone rather than all of said D2D UE's in connected mode; and the D2D discovery circuitry is further configured to utilize downlink transmission mode 9 multiple user- multiple input multiple output (DL TM 9 MU-MIMO) for transmitting the discovery message.

18. The system of claim 17, further comprising the operations of transmitting, by the UE, the discovery message utilizing one of the plurality of periodic discovery zones.

19. The system of claim 17, wherein said allocating further comprises selecting said subset of D2D UE's in a connected mode based at least in part on a type of D2D services.

20. The system of claim 17, wherein said at least one non-contention based discovery zone comprises a plurality of non-contention based discovery zones, and said allocating comprises configuring said periodicity to allow a particular one of said D2D UE's in connected mode to transmit discovery information only on a selected one of said plurality of non-contention based discovery zones.

21. A User Equipment (UE) comprising:

device-to-device (D2D) discovery circuitry configured to transmit a discovery message utilizing at least one of a plurality of periodic D2D discovery zones; wherein:

each of the plurality of periodic discovery zones includes a first plurality of resource blocks and a second plurality of subframes;

the plurality of periodic discovery zones are partitioned such that the plurality of periodic discovery zones comprise at least one non-contention based discovery zone that is available to D2D user equipment (UE's) that are in connected mode with an evolved node B (eNB), and at least one contention based discovery zone that is available to all D2D UE's irrespective of their Radio Resource Control (RRC) connection status;

a periodicity of the at least one non-contention based discovery zone is configured in a UE specific manner so as to allow transmission of discovery information from only a subset of said D2D UE's in connected mode on the at least one non-contention based discovery zone rather than all of said D2D UE's in connected mode;

wherein the D2D circuitry is further configured to configure the UE to utilize downlink transmission mode 9 multiple user-multiple input multiple output (DL TM 9 MU-MIMO) for transmitting the discovery message.

22. The UE of claim 21, wherein the D2D discovery circuitry is further configured to receive a semi-static signal from an evolved Node B (eNB), the semi-static signal related to a partition of the at least one non-contention-based D2D discovery zone.

23. The UE of claim 21, wherein the D2D discovery circuitry is configured to utilize a Slotted Aloha technique for transmitting the discovery message.

24. The UE of claim 21, wherein the discovery message comprises at least one of a unique identifier, UE status information and a sequence for channel estimation.

25. The UE of claim 21, wherein said D2D circuitry is further configured to select said subset of D2D UE's in a connected mode based at least in part on a type of D2D services.

26. The UE of claim 21, wherein said at least one non-contention based discovery zone comprises a plurality of non-contention based discovery zones, and said periodicity is configured to allow a particular one of said D2D UE's in connected mode to transmit discovery information only on a selected one of said plurality of non-contention based discovery zones.

* * * * *